(12) United States Patent
Eberth et al.

(10) Patent No.: US 8,371,838 B2
(45) Date of Patent: Feb. 12, 2013

(54) METHOD AND DEVICE FOR PLACING THIN MATERIAL LAYERS ONTO A RELIEF MOULD

(75) Inventors: Ulrich Eberth, Donauwoerth (DE); Hans-Martin Krafft, Stade (DE); Martin Friedrich, Harsum (DE)

(73) Assignees: Airbus Deutschland GmbH, Hamburg (DE); Deutsches Zentrum fuer Luft-und Raumfahrt E.V. (DLR), Cologne (DE)

( * ) Notice: Subject to any disclaimer, the term of this patent is extended or adjusted under 35 U.S.C. 154(b) by 0 days.

(21) Appl. No.: 13/229,506

(22) Filed: Sep. 9, 2011

(65) Prior Publication Data

US 2011/0318445 A1    Dec. 29, 2011

Related U.S. Application Data

(62) Division of application No. 12/067,517, filed as application No. PCT/EP2006/009065 on Sep. 18, 2006, now Pat. No. 8,066,929.

(60) Provisional application No. 60/718,652, filed on Sep. 20, 2005.

(30) Foreign Application Priority Data

Sep. 20, 2005   (DE) .......................... 10 2005 044 823

(51) Int. Cl.
   *B28B 11/08*   (2006.01)
(52) U.S. Cl. ..................... 425/388; 425/405.1; 264/313; 264/293; 264/320; 264/316
(58) Field of Classification Search .................. None
   See application file for complete search history.

(56) References Cited

U.S. PATENT DOCUMENTS

| 4,571,320 | A |   | 2/1986  | Walker |
|-----------|---|---|---------|--------|
| 4,875,962 | A |   | 10/1989 | Breakspear |
| 4,927,479 | A |   | 5/1990  | Bock |
| 5,092,954 | A |   | 3/1992  | Braun et al. |
| 5,196,242 | A | * | 3/1993  | Vicino .............. 428/12 |
| 5,247,518 | A |   | 9/1993  | Takiyasu et al. |
| 5,427,518 | A |   | 6/1995  | Morizot et al. |
| 5,626,814 | A | * | 5/1997  | Vicino ............ 264/511 |
| 6,519,891 | B2 | * | 2/2003  | Fulcher ................ 43/2 |
| 6,544,449 | B1 |   | 4/2003  | Gardner |

FOREIGN PATENT DOCUMENTS

| CA | 2031048 | A1 | 11/1990 |
|----|---------|----|---------|
| DE | 3033494 |    | 3/1982  |
| DE | 3516645 |    | 11/1986 |
| EP | 0160056 |    | 11/1985 |

(Continued)

OTHER PUBLICATIONS

Russian Notice of Allowance for Russian Application No. 2008114923-05(016551) mailed Dec. 20, 2010.

(Continued)

*Primary Examiner* — Yogendra Gupta
*Assistant Examiner* — Ninh Le
(74) *Attorney, Agent, or Firm* — Ingrassia Fisher & Lorenz P.C.

(57) ABSTRACT

The present invention relates to a method and a device for placing at least one material layer onto a relief mold for producing a composite material. Thereby, an elastically-reversibly deformable body with a surface relief that is designed to correspond to the relief mold is pressed against the material layer, as a result of which the surface of said body is deformed, and the material layer can be picked up. As a result of its elastically-reversible characteristics the body subsequently deforms back to its initial state so that the material layer can easily be placed onto the relief mold.

7 Claims, 2 Drawing Sheets

FOREIGN PATENT DOCUMENTS

| | | |
|---|---|---|
| EP | 0271263 | 11/1987 |
| EP | 0392974 | 10/1990 |
| EP | 0577505 | 1/1994 |
| JP | 06071681 | 3/1994 |
| RU | 2052353 C1 | 5/1990 |
| WO | 2006039124 A2 | 4/2006 |

OTHER PUBLICATIONS

Japanese Patent Office, Japanese Office Action and Notice of Reasons for Rejection, Transmitted Mar. 27, 2012 for Japanese Patent Application No. 2008-530435.

* cited by examiner

METHOD AND DEVICE FOR PLACING THIN MATERIAL LAYERS ONTO A RELIEF MOULD

CROSS-REFERENCE TO RELATED APPLICATIONS

This application is a divisional application of U.S. application Ser. No. 12/067,517, filed Sep. 9, 2008, now U.S. Pat. No. 8,066,929, which was the U.S. National-Stage entry under 35 U.S.C. §371 based on International Application No. PCT/EP2006/009065, filed Sep. 18, 2006, which was published under PCT Article 21 (2) and which claims priority to German Patent Application No. 10 2005 044 823.2 filed Sep. 20, 2005 and U.S. Provisional Patent Application No. 60/718, 652 filed Sep. 20, 2005, the disclosures of which are hereby incorporated herein by reference in their entireties.

TECHNICAL FIELD

The present invention, generally speaking, relates to the technical field of producing layered materials. In particular, the invention relates to two different methods for placing at least one material layer onto a relief mould for producing a composite material. Furthermore, the invention relates to a device for placing at least one material layer onto a relief mould for producing a composite material. Finally, the invention relates to the use of such a device in order to place, with it, at least one material layer onto a relief mould.

BACKGROUND TO THE INVENTION

Normally, composite materials are produced in that thin deformable material layers, such as for example woven materials, interlaid scrims, prepregs, papers, veneers, metal sheets, foils, nonwoven fabrics, and mats, or other sheet-like flexible material layers that in the context of the present invention are collectively referred to as a "material layer", are removed from a flat surface, such as for example a table, and are placed one on top of the other in a mould tool that comprises a base surface that is curved in one or two directions. In these known production processes of composite materials, up to now the individual material layers have been manually picked up and placed in the mould tool. While there have been experiments to automate the placing of material layers in the mould tool, these experiments have, however, so far exclusively resulted in very expensive robot-gripper kinematics that are associated with very considerable technical implementation expenditure and enormous costs without returning anywhere near satisfactory results.

In the automation of the placement procedure of material layers in form tools with one-dimensional or two-dimensional curved surfaces, which in the context of the present invention are collectively referred to as relief moulds, there is a problem in that in the unrolled state the material layers to be placed are normally too big, and can therefore not at all or only unsatisfactorily be placed in a sheet-like manner in the tool mould, as shown in FIG. 1. Thus, such tool moulds for the production of layered materials as a rule comprise lateral delimitations, which results in a material layer that is to be placed into a mould not fitting in the tool mould in the stretched state of said material layer.

Furthermore, when placing material layers in a tool mould there is a further problem in that in order to produce particular geometric shapes of the composite to be produced, several material layers of different sizes are placed in a tool mould, for example in order to achieve material reinforcement in one position of the composite. However, this means that in known automation attempts, for example with the use of the above-mentioned robot-gripper kinematics, for each individual material layer a new matching gripper geometry is required so that no irregularities such as wrinkling or the like occur when the actual material layer is placed onto a material layer that has previously been placed in the tool mould.

SUMMARY OF THE INVENTION

Starting from the above-described problems related to known implementation attempts for producing a composite material, there may be a need to provide an implementation that makes it possible to place a material layer onto a relief mould in a way that is associated with modest technical and financial expenditure.

There may be provided two differently designed methods for placing at least one material layer onto a relief mould for producing a composite material; by a device for placing at least one material layer onto a relief mould for producing a composite material; as well as by the use of such a device. Below, the two differently designed methods, the device and the use are described in detail, wherein of course all the characteristics of the methods can be transferred to the device as well as to the use of the device, and vice-versa in an analogous manner.

A first embodiment of the method according to the invention for placing at least one material layer onto a relief mould for producing a composite material provides for an elastically-reversibly deformable surface with a surface relief that in a non-deformed state corresponds to the relief mould is pressed against the material layer, wherein the surface relief elastically deforms such that the surface rests flat against the material layer. In order to make it possible to accommodate the material layer, a retention force is generated on the surface, which retention force fixes the material layer to the surface at least temporarily. While it can prove to be energy-saving if the retention force is generated only after the surface has been pressed against the material layer, it is of course also possible for the retention force to be generated already before or during the procedure of pressing the surface against the material layer. In order to make it possible for the material layer to be placed onto the relief mould in an orderly manner without wrinkling it is necessary to first impart said material layer with a shape that corresponds to that of the relief mould so that the material layer can be placed in a simple manner. To this effect the pressure force, which has previously been built up by pressing the surface against the material layer, is gradually reduced, which can, for example, take place by lifting the surface from the placement area, on which the material layer has been deposited. As a result of this the surface relaxes back to its non-deformed state, thus giving the material layer a surface relief that corresponds to the relief mould because the material layer is fixed to the surface by the retention force. In order to make possible simple placement of the material layer with the surface relief produced in this way onto the relief mould, the surface, together with the material layer fixed to it, is arranged opposite the relief mould such that the surface relief of the material layer correspondingly fits to the relief mould. Finally, the material layer is placed onto the relief mould in that the previously generated retention force is cancelled. In this way the material layer becomes detached from the surface and remains lying on the relief mould in the desired way. In order to be able to subsequently place a further material layer onto the relief mould, which material layer may be different in size when compared to the previously applied material layer, the method is initiated anew in that either a retention force is generated first or the elastically-reversibly deformable surface is pressed against the new material layer.

A second embodiment of the method according to the invention for placing at least one material layer onto a relief mould for producing a composite material provides for an elastically-reversibly deformable surface to be arranged on the material layer such that the surface rests flat against the material layer. Thereby, there is no need for the surface to have a surface relief that corresponds to the relief mould. In order to, again, be able to pick up the material layer from its support on which it has been placed, a retention force is generated that fixes, at least temporarily, the material layer to the surface. Also in this embodiment of the method it is possible to generate the retention force already prior to arranging the surface on the material layer. After this the surface, together with the material layer fixed thereto, can be arranged facing the relief mould and subsequently, by the surface, the material layer can be pressed against the relief mould in such a way that the material layer is given a surface relief that corresponds to the relief mould. By this adaptation of the material layer by the elastically-reversibly deformable surface, it is again possible to ensure wrinkle-free placement of the material layer onto the relief mould. After a surface relief that corresponds to the relief shape has been forced onto the material layer in this way, finally the retention force can be cancelled in order to place and deposit the material layer onto the relief mould in this way.

While at a first glance the two differently designed methods appear to differ only slightly from each other, these two embodiments are, however, true alternatives because in the first embodiment of the method the surface relief of the material layer is produced in that the elastically-reversibly deformable surface returns to its non-deformed initial state in which its surface relief corresponds to that of the relief mould. In contrast to this, in the second embodiment of the method according to the invention, the surface relief of the material layer is produced in that the material layer is pressed onto the relief mould by the elastically-reversibly deformable surface, as a result of which a surface relief that corresponds to that of the relief mould is forced both onto the material layer and onto the surface.

With the two previously described methods it is thus very easy to remove material layers in an automated way from a flat surface and to place them, free of any wrinkles, with a defined surface structure onto a relief mould. The methods make it possible to place material layers of different sizes onto geometric relief shapes that are different or at least similar. With the use of the method according to the invention it is possible to do without expensive robot-gripper kinematics, as a result of which the costs incurred can be reduced and process reliability can be enhanced.

So as to, in both embodiments of the method, generate a retention force on the surface, the surface can, for example, be subjected to a suction stream. For example, a multitude of suction apertures can be provided in the surface, which suction apertures are subjected to a suction stream. An alternative to generating a retention force can, for example, consist of electrostatically charging the surface. Yet another alternative to generating a retention force can consist of the retention force being generated by an adhesive force or a magnetic force. Of course, the person skilled in the art will know further options of generating a retention force, so that there is no need to provide further details in this regard.

According to a further aspect of the present invention the object on which the invention is based is met by a device for placing at least one thin deformable material layer onto a relief mould for producing a composite material, which mould comprises an elastically-reversibly deformable body that forms a surface which is designed for generating a retention force for fixing the material layer.

Thereby, the body can be made from almost any desired material that due to its characteristics is able to automatically bring back the body from its deformed state to its non-deformed state. Such elastically-reversible materials characteristics are required so that the surface of the body can adapt to any desired surface geometries as a result of pressure applied to the body in order to be able, after reduction in the pressure force, to return to its non-deformed initial state. For example, the body can be made from suitable elastic rubber materials or foam materials such as foamed sponge or plastic foam materials that can, for example be selected from the group comprising polystyrol, styrol copolymer, PVC, polycarbonate, polyolefin, polyurethane, polyisocyanurate, polycarbodiimide, polymethacrylimid, polyamide, ABS, phenolic resin and urea resin. Apart from these synthetic materials the body can, of course, also comprise naturally elastically-reversible materials such as, for example, natural caoutchouc, natural sponge and the like. Of course any other material that ensures the above-mentioned elastically-reversible characteristics can be used for the deformable body.

While it is possible for the surface in its non-deformed state to be completely flat, so as to in this way be able to accommodate a material layer placed on a flat backing in order to later press said material layer onto a relief mould, as a result of which both the material layer and the surface of the body conform to the surface of the body. As an alternative to this, in the non-deformed state of the body the surface can also comprise a surface relief that corresponds to the relief mould. In this case a flat material layer that has been put in place would be able to be picked up by the body in that the surface is pressed against the material layer, as a result of which the surface relief of the surface elastically deforms such that the surface rests flat against the material layer. After the pressure force has subsequently been reduced, as a result of which the surface returns to its non-deformed state, thus giving the material layer a surface relief that corresponds to that of the relief mould, the material layer can be placed on the relief mould so that the surface relief of the material layer correspondingly matches the relief mould.

In order to make it possible for the surface to generate a retention force for fixing the material layer, a multitude of suction apertures can be provided on the surface, to which suction apertures a suction stream is applied so that a material layer that contacts the surface is sucked to the surface.

In order to generate the suction stream the device can comprise a suction chamber, by way of which the multitude of suction apertures are subjected to the above-mentioned suction stream. In this arrangement, negative pressure is applied, by a vacuum unit, to the suction chamber itself, with said negative pressure in the form of the above-mentioned suction stream propagating towards the suction apertures.

In order to lead the suction stream from the suction chamber to the multitude of suction apertures, the body can comprise a multitude of suction tubes that connect the suction chamber for generating the suction stream, of which suction chamber there is at least one, to the multitude of suction apertures.

Since due to the elastically-reversible surface of the device according to the invention it is possible to pick up material layers of different sizes by the device, it is intended that, depending on the size of the material layer, a suction stream be applied only to those suction apertures that are covered by the material layer. If at all possible, no suction stream should be applied to the remaining exposed suction apertures as this would involve unnecessary loss of energy. In order to ensure this targeted application of a suction stream to designated suction apertures, the device comprises a multitude of suction chambers, wherein each one of the multitude of suction chambers is connected to a plurality of the multitude of tubes. In this way, by separate activation of the individual suction chambers, it can be ensured that a suction stream is applied in a targeted way to the suction apertures.

Finally, according to a further aspect of the present invention, the object of the invention is met by the use of the device according to the invention so as to, with it, place at least one material layer onto a relief mould.

BRIEF DESCRIPTION OF THE DRAWINGS

Below, the invention is explained by way of an example with reference to the enclosed drawings. The figures are intended purely to illustrate the invention and are, in particular, not to be interpreted as restricting the scope of the invention in any way. The following are shown.

In all the figures, identical or similar elements have identical or corresponding reference characters.

DETAILED DESCRIPTION

Figure 1:
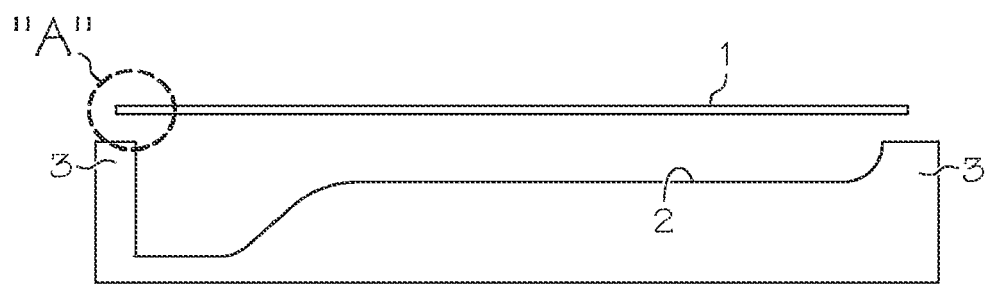
FIG. 1 concretely explains the problem when placing a material layer in a relief mould.

Below, with reference to FIG. 1, the problem is explained that can be encountered when placing a material layer in a relief mould. FIG. 1 shows a relief mould 2 that is laterally delimited by two sidewalls 3. Since the surface of the relief mould 2 comprises a height gap, the material layer 1 that is to be deposited to the relief mould 2 must be of a length that corresponds to the unwinding of the relief mould 2. This makes it necessary for the length of the material layer 1 to be longer than the clearance between the two sidewalls 3, which is why the material layer 1, as indicated in FIG. 1 by the region "A", overlaps the left sidewall 3 so that in this way it cannot be placed flat onto the relief mould 2.

Figure 2:
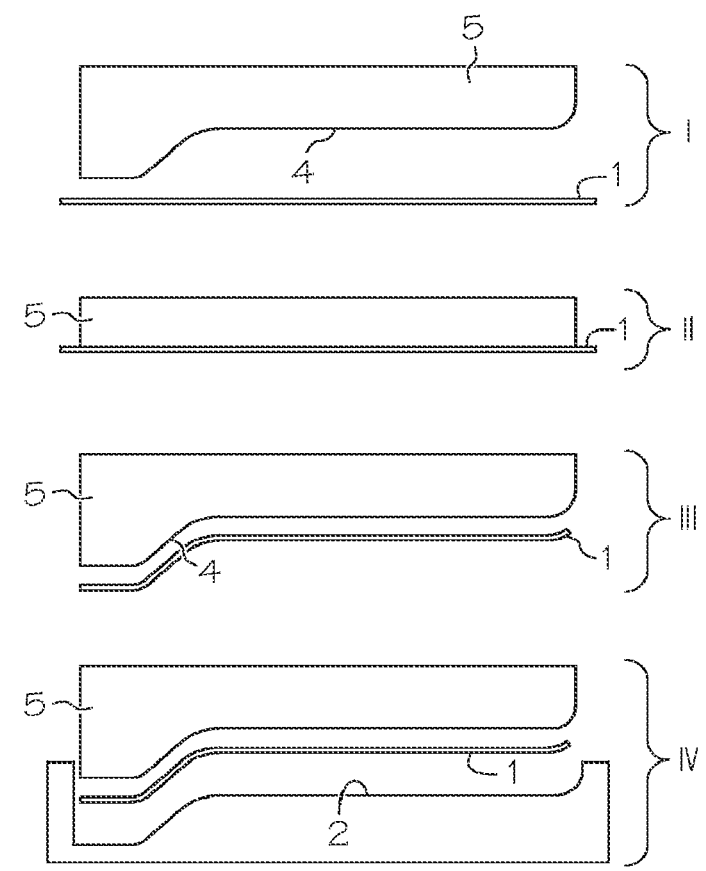
FIG. 2 concretely explains a first embodiment of the method according to the invention.

In order to solve this problem, as well as solving the additional problems, as mentioned above, encountered during the placement of a material layer 1 in a relief mould 2, the present invention therefore proposes two differently designed methods, of which a first method is concretely shown in FIG. 2. Thus, at first, an elastically-reversibly deformable body 5 with a surface that in the non-deformed initial state of the body comprises a surface relief that corresponds to the relief mould 2 is arranged such that the surface 4 faces the material layer 1 (illustration I in FIG. 1). In this arrangement the material layer 1 is placed, for example, on a table (not shown in detail) so that the body 5 with its elastically-reversibly deformable surface 4 can be pressed against the material layer 1, wherein the surface relief of the surface 4 elastically deforms such that the surface 4 rests flat against the material layer 1, as is concretely shown in illustration II of FIG. 2. In the state shown in illustration II it is then, for example, possible to generate a retention force on the surface 4, by which retention force the material layer 1 is fixed to the surface 4. Of course, it is also possible to generate the retention force already at an earlier stage.

In the state of illustration III of FIG. 2 the pressure force generated in illustration II has been reduced in that the body 5 has been lifted from the table (not shown). As a result of this the surface 4 of the body 5, due to its elastically-reversible characteristics, has returned to its non-deformed initial state, as a result of which the material layer 1 assumes it original surface relief that corresponds to the relief mould. As a result of this contour conformity of the material layer 1, said material layer 1 now no longer projects beyond a sidewall 3, as explained with reference to FIG. 1, and can thus, as shown in Fig. IV, be arranged together with the surface 4 opposite the relief mould 2 so that the surface relief of the material layer 1 correspondingly conforms to the relief mould 2. After some slight lowering of the body 5 in the direction of the relief mould 2, finally the previously generated retention force can be cancelled, as a result of which the material layer 1 can be deposited to the surface relief 2.

Figure 3:
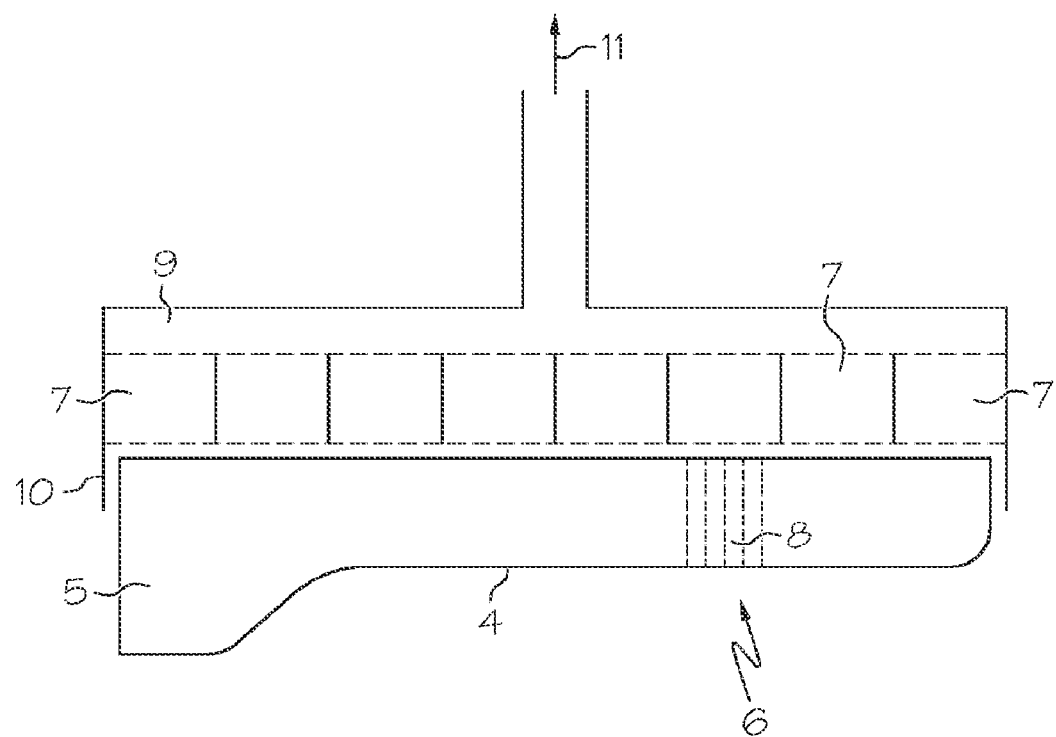
FIG. 3 shows a device according to the invention.

With reference to FIG. 3, the device according to the invention for placing a material layer 1 onto a relief mould 2 for producing a composite material is described. The device according to the invention comprises a body 5, which on its underside forms a surface relief that matches the relief mould 2, onto which surface relief a material layer 1 is to be placed by the device. Thereby, the body 5 comprises an elastically-reversibly deformable material as described above. The body 5 is accommodated by a holder 10 of the device, in which a multitude of suction chambers 7 are arranged side by side. Above the suction chambers there is a so-called distributor chamber 9 that is connected to a vacuum suction device 11 and that leads to a vacuum unit (not shown). By way of this suction device 11, negative pressure is generated in the distributor chamber 9, which negative pressure propagates to the individual suction chambers 7 by way of apertures that connect the multitude of suction chambers to the distributor chamber.

The top the body 5 rests flat against the underside of the suction chambers 7, so that negative pressure generated in the suction chambers 7 propagates by way of a multitude of small apertures on the underside of the suction chambers 7 in a multitude of suction tubes 8 with which the body 5 is interspersed. While FIG. 3 only shows a few suction tubes 8, the body 5 is, however, interspersed along its entire length with these suction tubes 8. Thereby, the suction tubes 8 lead to suction apertures 6 in the surface 4, which are not shown in detail. In this way, by way of a vacuum suction device 11, the distributor chamber 9, the suction chambers 7 and the suction tubes 8, a retention force can be generated on the surface 4 by a suction stream, as a result of which a material layer 2 that comes into contact with the surface 4 can be fixed to the surface 4.

If a material layer 1 does not cover the entire surface 4, the individual suction chambers 7 can be activated separately, which can, for example, be achieved in that the apertures that connect the individual suction chambers 7 to the distributor chamber 9 can be closed by way of a valve.

In addition it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above. Reference characters in the claims are not to be interpreted as limitations.

We claim:

1. A device for placing a material layer onto a relief mould for producing composite materials, the device comprising:
   an elastically-reversibly deformable body, the elastically-reversibly deformable body comprising:
      a surface that is configured to alternately assume a deformed state and a non-deformed state and further configured to generate a retention force while in the deformed state that fixes the material layer onto the relief mould and that places the material layer onto the relief mould upon a cancellation of the retention force;

a foam material that is configured to return the elastically-reversibly deformable body from the deformed state to the non-deformed state; and a surface relief of the surface in the non-deformed state that corresponds to the relief mould, the surface is configured to elastically deform under a pressure force so that the surface is substantially flat against the material layer in the deformed state, wherein the elastically-reversibly deformable body is arranged with the material layer that has been fixed to a corresponding surface of the relief mould so that a surface relief of the material layer conforms to the relief mould;

a holder configured to build up the pressure force by pressing the elastically-reversibly deformable body onto the material layer deposited on a placement area and further configured to reduce the pressure force by lifting the surface from the placement area, which relaxes the surface into the non-deformed state, and imparts to the material layer a corresponding surface relief that corresponds to the relief mould; and a suction stream that is configured to generate the retention force on the material layer and temporarily fix the material layer to the surface.

2. The device of claim 1, wherein the surface comprises a multitude of suction apertures to which the suction stream is applied.

3. The device of claim 2, further comprising at least one suction chamber by way of which the suction stream is applied to the multitude of suction apertures.

4. The device of claim 3, wherein the elastically-reversibly deformable body comprises a multitude m of suction tubes, which connect the suction chamber to the multitude of suction apertures.

5. The device of claim 4, wherein the device comprises a plurality of suction chambers, wherein each individual one of the plurality of suction chambers is connected to a plurality of suction tubes.

6. The device of claim 4, wherein each individual one of the plurality of suction chambers can separately be activated.

7. A device for placing at least one material layer onto a relief mould for producing composite materials, the device comprising: an elastically-reversibly deformable body; wherein the device is configured to build up a pressure force by pressing the elastically-reversibly deformable body onto the material layer deposited on a placement area; wherein the elastically-reversibly deformable body comprises a surface which is configured to generate a retention force for fixing the material layer while in a deformed state; wherein the device is configured to generate the retention force on the material layer by a suction stream, which temporarily fixes the material layer to the surface; wherein the elastically-reversibly deformable body is made of a foam material which is configured to automatically bring back the body from the deformed state of the body to a non-deformed state of the body; wherein the surface of the elastically-reversibly deformable body in the non-deformed state comprises a surface relief that corresponds to the relief mould; wherein the surface relief is configured to be elastically deformed by the pressure force so that the surface of the body rests flat against the material layer; wherein the device is configured to reduce the pressure force by lifting the surface from the placement area, as a result of which the surface relaxes to its non-deformed state and in so doing imparts to the material layer a surface relief that corresponds to the relief mould; wherein the device is configured to arrange the elastically-reversibly deformable body together with the material layer that has been fixed to its surface opposite the relief mould so that the surface relief of the material layer correspondingly matches the relief mould; and wherein the device is configured to place the material layer onto the relief mould by cancelling the retention force.

* * * * *